United States Patent [19]
Barraza et al.

[11] Patent Number: 5,812,085
[45] Date of Patent: Sep. 22, 1998

[54] REMOTE CONTROL DEVICE

[75] Inventors: Steven E. Barraza, Santa Clara; William R. Knapp, Menlo Park; Scott Summit, Portola Valley, all of Calif.

[73] Assignee: Samsung Information Systems America, San Jose, Calif.

[21] Appl. No.: 699,028

[22] Filed: Aug. 15, 1996

[51] Int. Cl.[6] .................................................. H03K 17/94
[52] U.S. Cl. ......................... 341/176; 341/173; 340/573; 200/61.58 R; 348/164
[58] Field of Search ..................................... 341/173, 176; 340/573, 635, 644, 654; 348/559, 162, 164; 200/61.58 R

[56] References Cited

U.S. PATENT DOCUMENTS

| | | | |
|---|---|---|---|
| D. 266,758 | 11/1982 | Johannsen et al. | D13/168 |
| D. 337,588 | 7/1993 | Cruz et al. | D14/218 |
| D. 356,570 | 3/1995 | Shinohara et al. | D14/218 |
| D. 363,486 | 10/1995 | Shinohara et al. | D14/218 |
| D. 372,245 | 7/1996 | Brooks | D14/218 |
| D. 377,023 | 12/1996 | Andrea | D14/218 |
| D. 377,797 | 2/1997 | Stropkay et al. | D14/218 |
| 4,380,121 | 4/1983 | Naimer | 200/61.58 R |
| 4,969,508 | 11/1990 | Tate | 165/209 |
| 5,381,142 | 1/1995 | Simmons | 341/26 |
| 5,545,857 | 8/1996 | Lee | 128/18 |
| 5,657,091 | 8/1997 | Bertram | 348/559 |

*Primary Examiner*—Brian Zimmerman
*Assistant Examiner*—Albert K. Wong
*Attorney, Agent, or Firm*—Lowe Hauptman Gopstein Gilman & Berner

[57] ABSTRACT

A handheld control device, such as an air mouse, for remotely operating a controlled device, such as a TV, computer (PC), VCR or digital satellite system is provided with a microprocessor. In order to conserve battery power, the microprocessor may be switched from a high power awake state in which the air mouse functions are performed, and a low power sleep state. Power is conserved through the use of conductive outer surfaces that form a switch that controls the awake/sleep state of the microprocessor. The holding of the remote control device in the hand of a user with a finger on a conductive control button awakens the microprocessor. Conversely, the microprocessor enters the sleep state once the user hand is removed from its operating position on the remote control device.

18 Claims, 10 Drawing Sheets

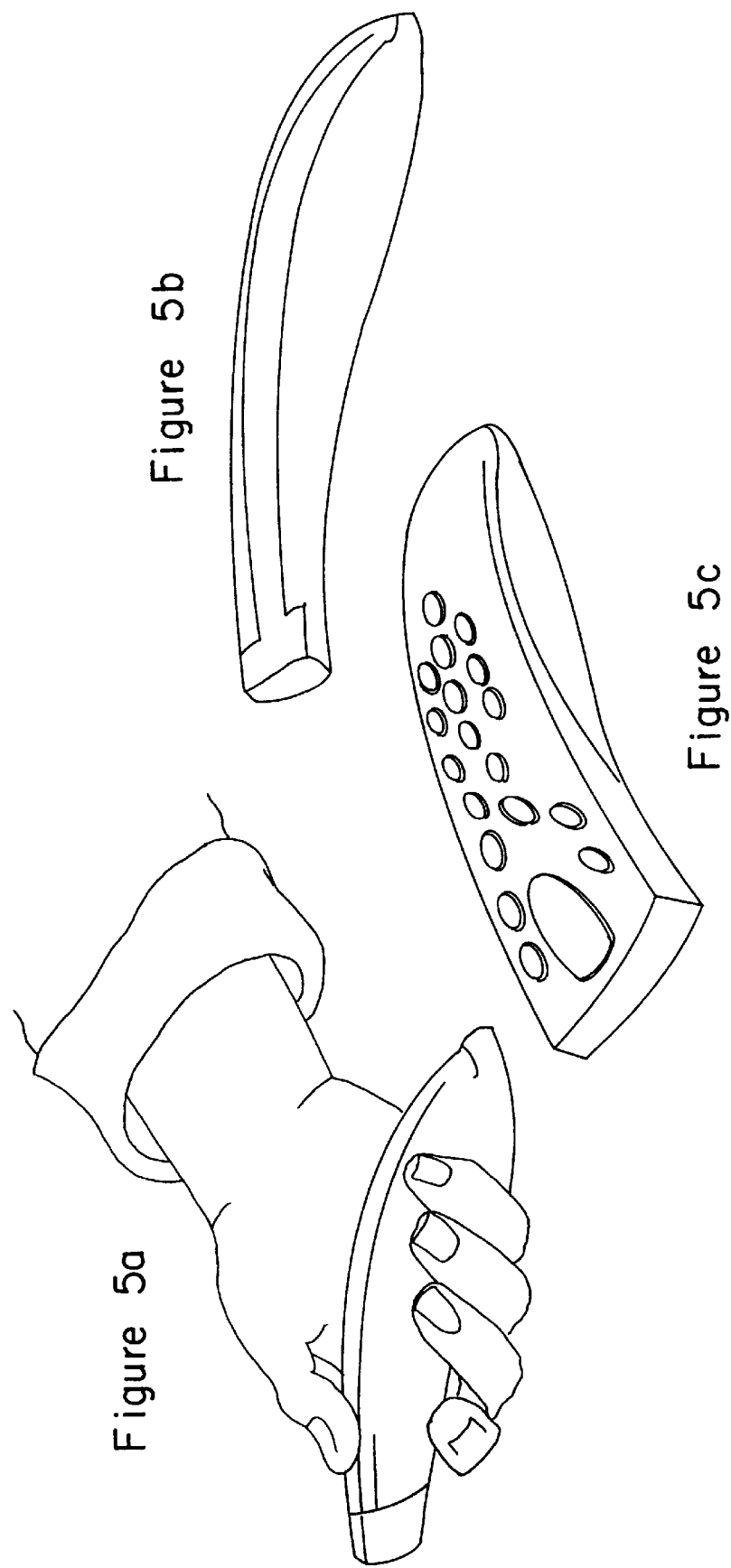

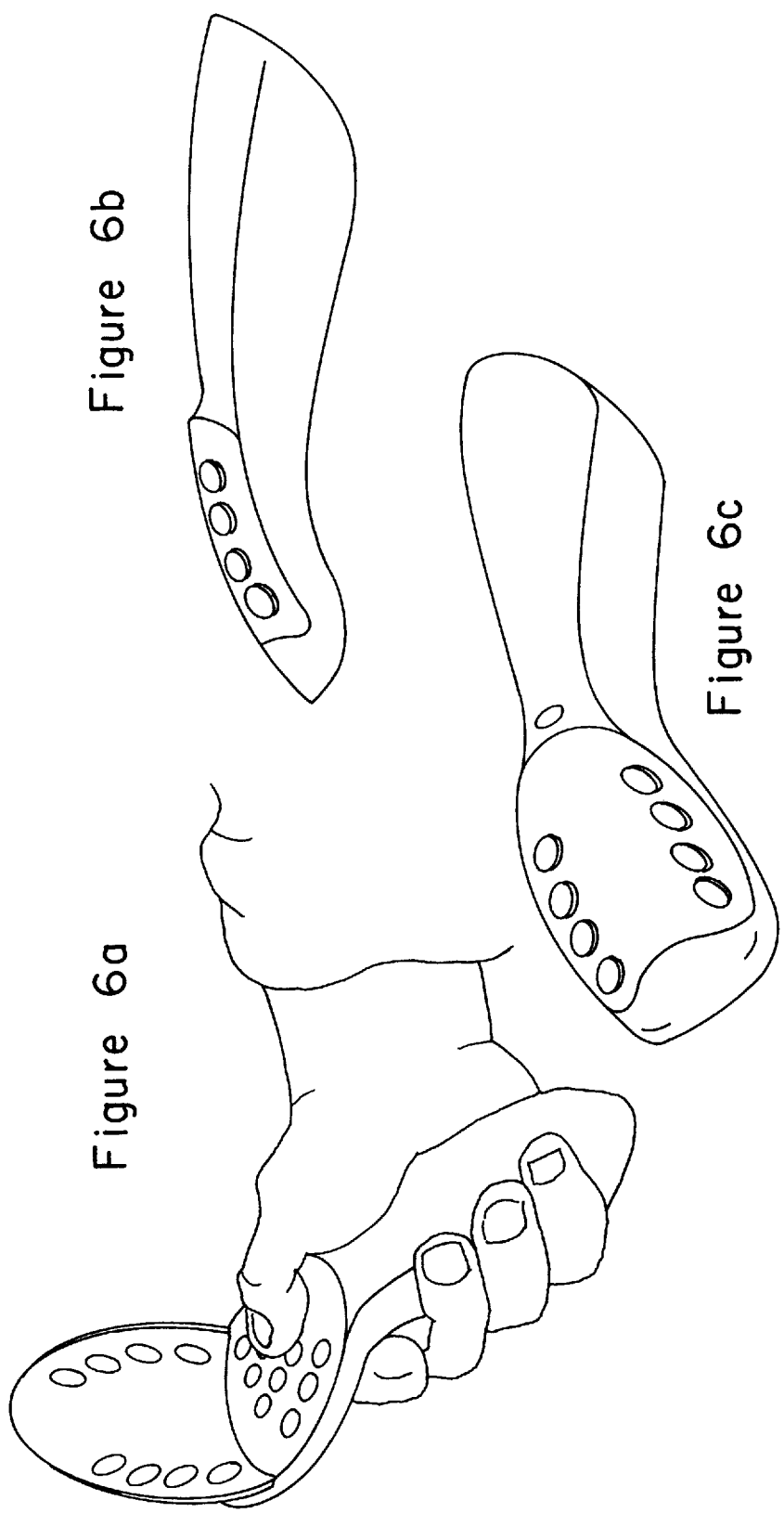

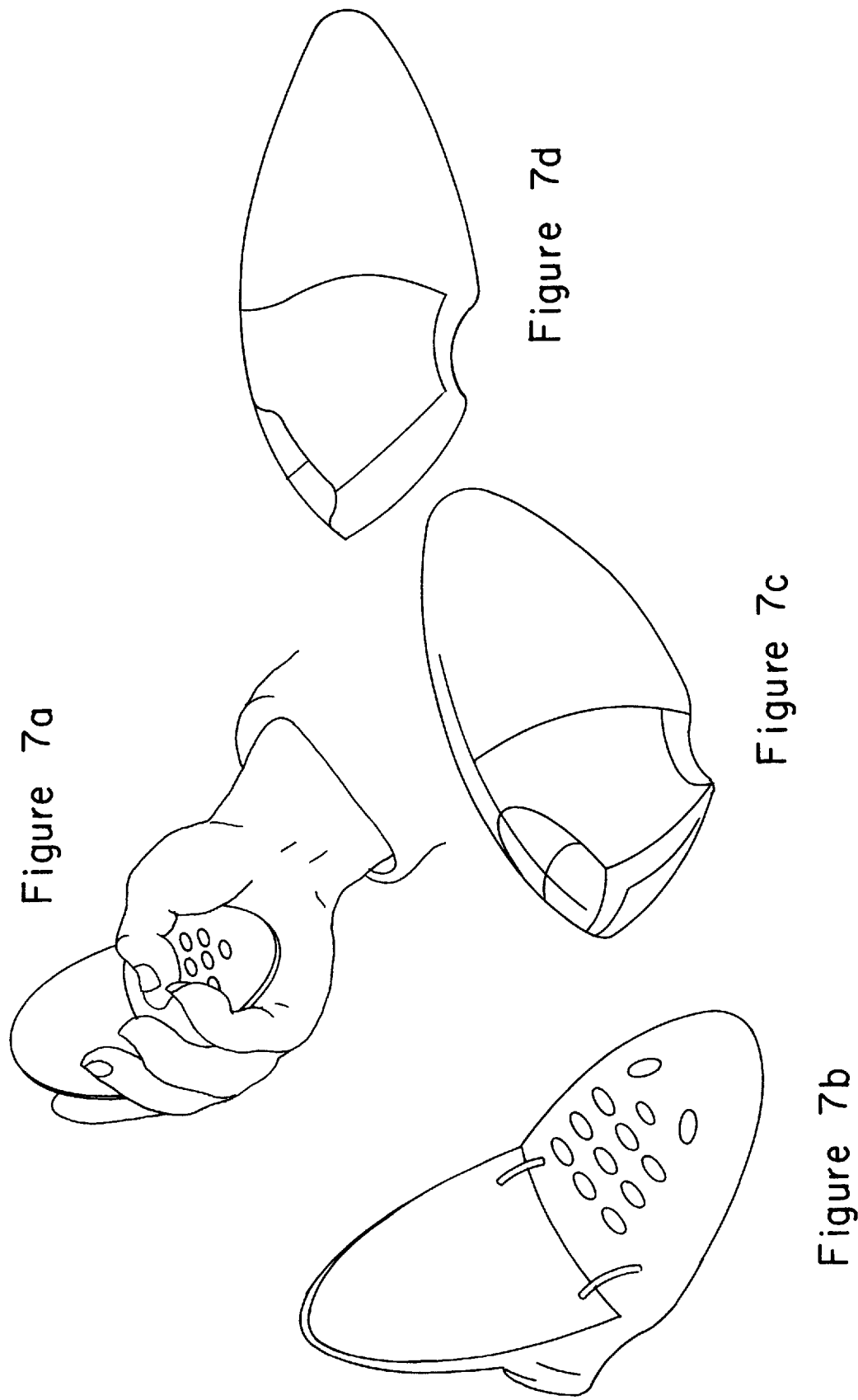

REMOTE CONTROL DEVICE

FIELD OF THE INVENTION

The present invention relates to the field of control devices, and more particularly, to hand-held control devices for remotely operating a controlled device, such as a TV, computer (PC), VCR or digital satellite system.

BACKGROUND OF THE INVENTION

Conventional remote control devices, used to operate televisions, VCRs and the like, are relatively linear in design. The remote control normally needs to be pointed at the stationary device to be controlled in order to communicate with the stationary device. The linear design of a conventional remote control forces the hand and wrist of the user into an awkward position in order to accurately point the remote control and at the same time operate the buttons on the remote control.

This problem will become even more noticeable as interactive multimedia becomes more prevalent, due to the amount of controlling that a user will perform with the remote control. For example, the remote control can be used as an "air mouse", or click and point device, in conjunction with a PC, VCR or a digital satellite system with on-screen program guides. It is expected that using the remote control in an awkward position for extended periods of time may lead to fatigue and more serious medical problems, such as carpal tunnel syndrome.

Another problem with current remote control devices arises when they are used as an air mouse. This problem is the relatively large power requirements of a microprocessor in the devices, which provides the remote control devices with the air mouse functionality. Maintaining the microprocessor in a state of readiness requires a large power consumption, causing frequent battery replacement. This is not usually a problem in conventional remote control devices in which the actuation of a button, such as a volume control, causes the current to flow from the battery power supply and activate the circuitry on the printed circuit board. However, with the advent of air mouse technology and the attendant use of power-hungry microprocessors, the power drain on the batteries will necessitate their frequent replacement in remote control devices. This is both expensive and annoying to the user.

There is a need for a remote control device that provides a more natural design that enables a user to point and operate the remote control device with a reduced amount of strain. There is also a need for a remote control device that has a reduced battery drain when the remote control device contains relatively large power consumption devices.

SUMMARY OF THE INVENTION

These and other needs are met by the present invention which provides a remote control device that has its communication section, which is pointed at a controlled device, angled with respect to the gripping area of the remote control device. This angling allows the remote control device to be held and operated by a user in a natural "handshake" position that is normally assumed by a person extending their hand forward. Since the remote control device is designed to be operated while the hand is in a naturally assumed position, the remote control device of the present invention can be operated for longer periods of time with reduced fatigue and strain.

The earlier stated needs are also met by another embodiment of the present invention, which provides a remote control device containing a large power consumption circuit, in which power is conserved through the use of conductive outer surfaces that form a switch that controls an awake/sleep state of the power consumer. The holding of the remote control device in the hand of a user with a finger (or thumb) on a button places the power consumer (such as a microprocessor) in an active or awake state. Conversely, in certain embodiments, the power consumer enters the sleep mode once the user hand is removed from its operating position on the remote control device.

One of the advantages of these embodiments of the present invention is the reduction in power drain, and therefore battery replacement, when the remote control device contains circuitry, such as a microprocessor, that consumes large amounts of power.

The foregoing and other features, aspects and advantages of the present invention will become more apparent from the following detailed description of the present invention when taken in conjunction with the accompanying drawings.

BRIEF DESCRIPTION OF THE DRAWINGS

FIGS. 5a–5c depict different views of another embodiment of the present invention.

FIGS. 6a–6c depict different views of another embodiment of the present invention.

FIGS. 7a–7d depict different views of another embodiment of the present invention.

DETAILED DESCRIPTION OF ILLUSTRATIVE EMBODIMENTS

Figure 1:
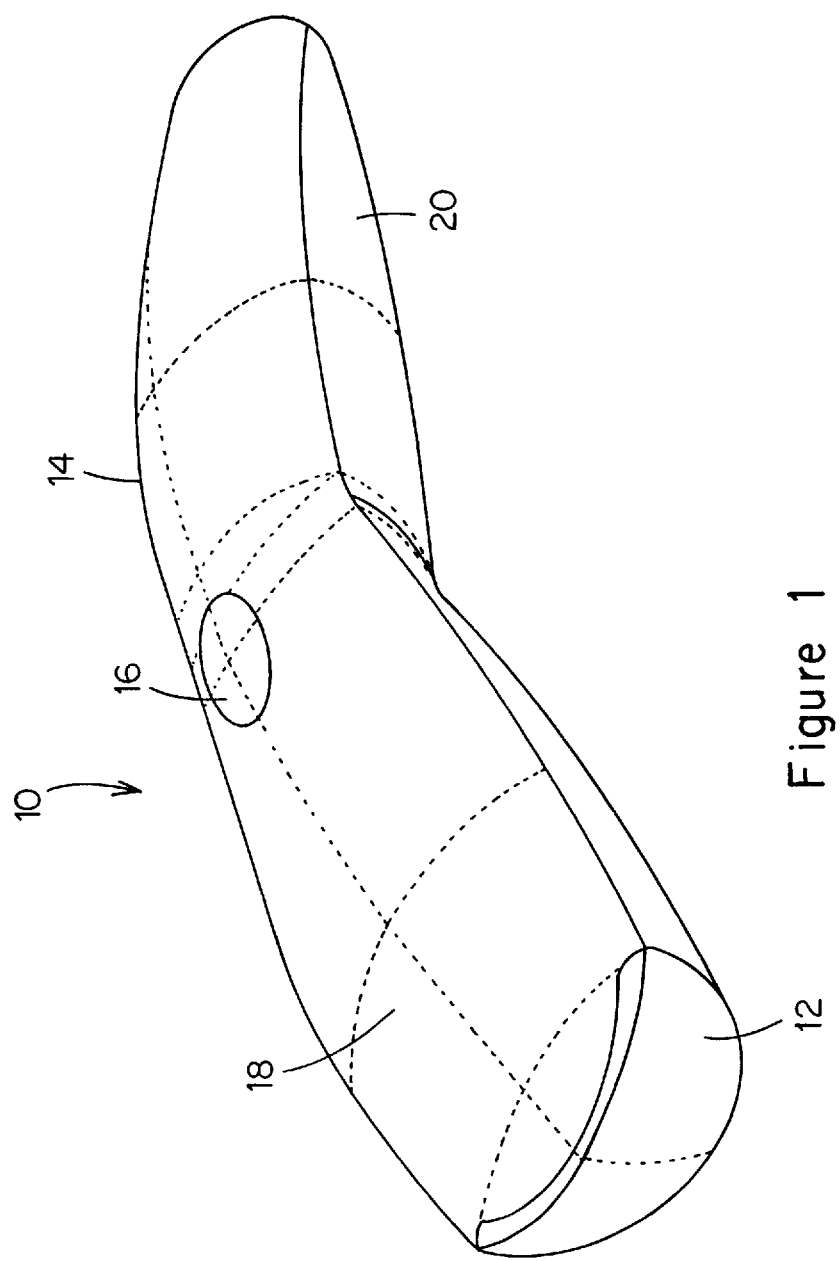
FIG. 1 is a perspective view of a remote control device constructed in accordance with an embodiment of the present invention.

FIG. 1 is a perspective view of an embodiment of the present invention, but with only one button depicted for clarity of illustration of the shape of the remote control device 10. The remote control device 10 has a communication section 12, which is normally pointed at the controlled device (not depicted). The remote control device 10 is held at the grip end 14, which may also contain the batteries that supply power to the remote control device 10.

The remote control device 10, in certain embodiments, has a conductive plate 20 on the bottom of the grip 14 that acts with a control button 16 to close a circuit which controls whether certain circuitry in the remote control device is in an awake mode or a sleep mode. As described in more detail later with respect to FIG. 9, this arrangement provides a great savings in power consumption by the remote control device 10 since circuitry that consumes a large amount of power will be in an awake mode (high power consumption mode) only when actually needed by the user.

In certain embodiments, not shown, the button 16 does not form part of the switch circuit, and other conductive areas on the grip 14 are provided, such as on the top part of the grip 14, to control the awake/sleep mode of the power consuming circuitry. Other types of switches activated in response to picking up and holding the remote control device are also contemplated.

Figure 4:
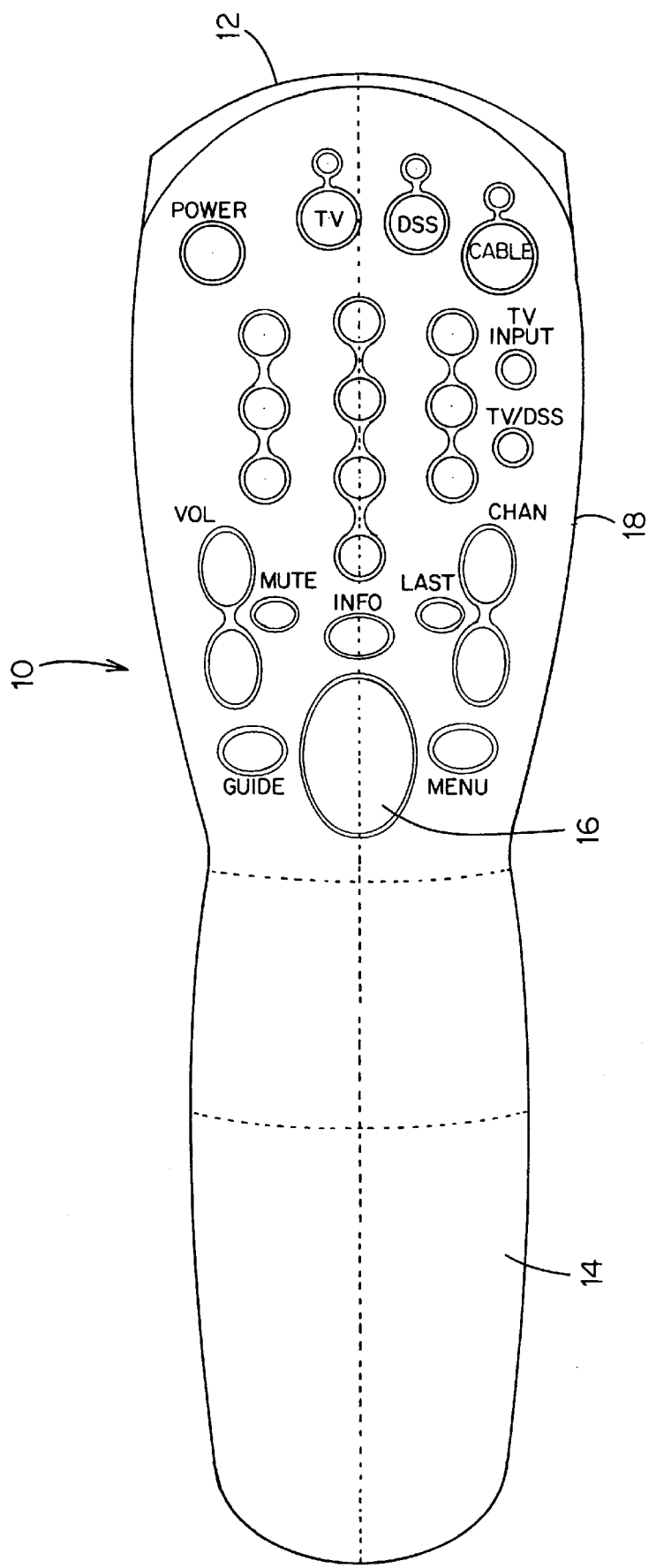
FIG. 4 is a top view of the remote control device of FIG. 1, with an exemplary layout of control buttons.

The remote control buttons are provided in a control button area 18. An exemplary layout of buttons is depicted in the top view of FIG. 4. It should be apparent that the invention is not limited to the use of control "buttons" per se, but also includes other types of actuation mechanisms, such as touch sensitive pads, rocker switches, etc.

Figure 2:
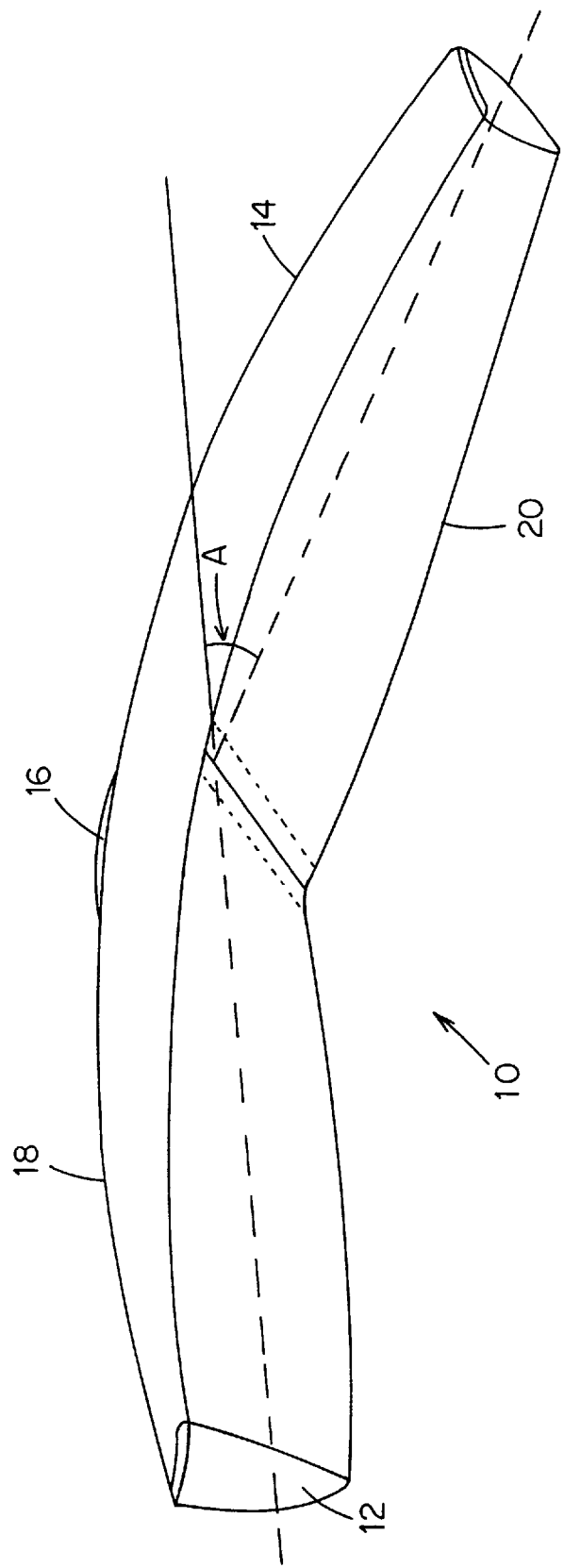
FIG. 2 is a side view of the remote control device of FIG. 1.

FIG. 2 is a side view of the remote control device 10 of FIG. 1. As is apparent from FIG. 2, the communication section 12, which will be pointed at the controlled device, is angled with respect to the grip section 14 of the remote control device 10 by an angle A. This angling allows the remote control device to be held and operated by a user in a natural "handshake" position that is normally assumed by a person extending their hand forward. The angle may range from approximately 9 degrees to approximately 18 degrees, with an exemplary preferred angle of 12.5 degrees, to provide an angling that allows comfortable handling and operation of the remote control device 10. Other angles are possible, however, and fall within the spirit and scope of the present invention.

Figure 3:
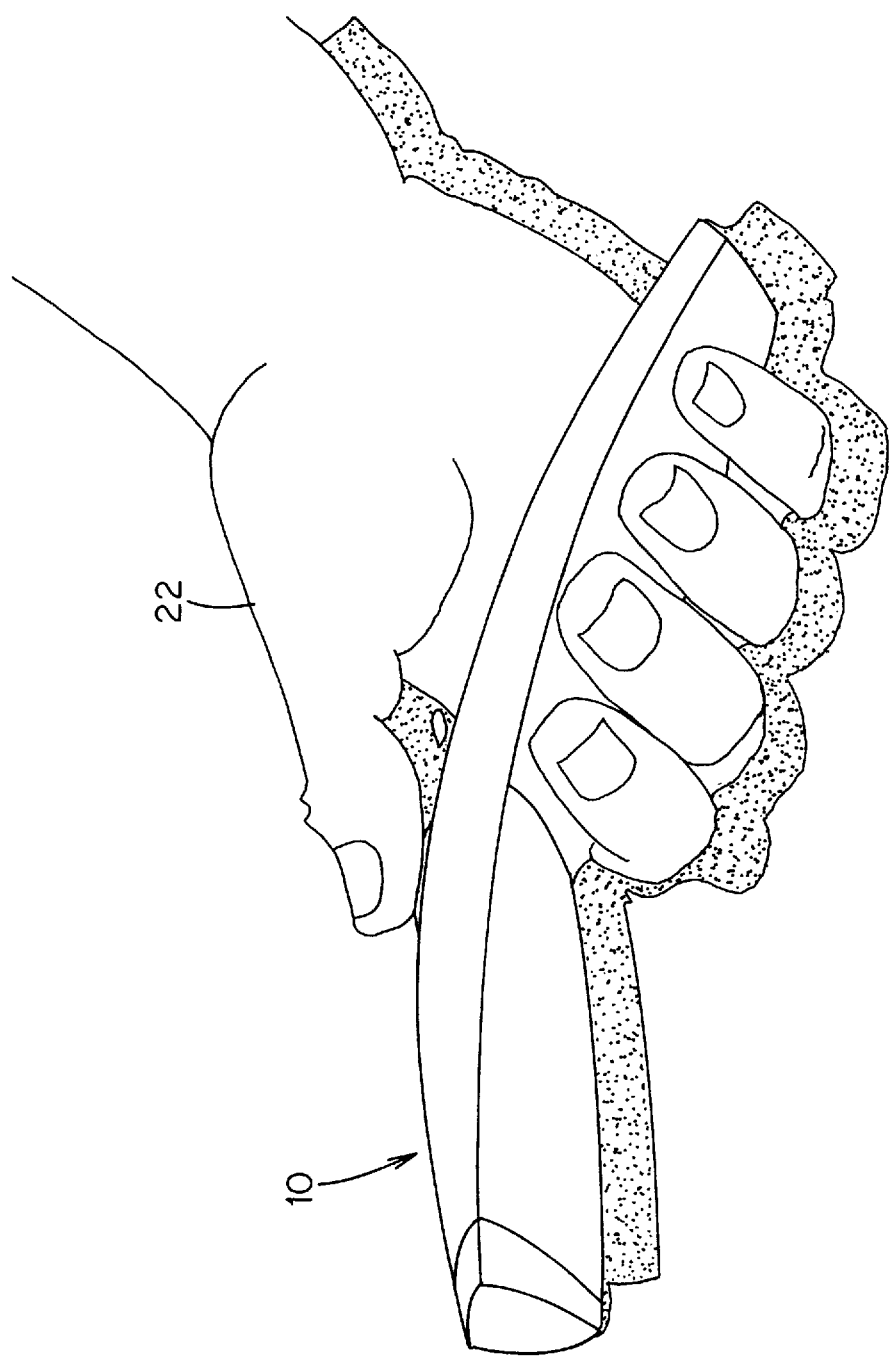
FIG. 3 depicts the remote control device of FIG. 1 being operated by a user.

FIG. 3 depicts the remote control device 10 being held and operated by a user hand 22 that is in a natural handshake position.

FIGS. 5a–5c depict different views of another embodiment of the present invention that provides the user with a remote control device that can be held and operated in a natural fashion.

FIGS. 6a–6c depict different views of still another embodiment of the present invention. This embodiment has a flip-up control button section cover that covers the control buttons when the remote control device is not in use.

FIGS. 7a–7d depict different views of a further embodiment of the present invention. This embodiment has a flip-up control section cover that covers the control buttons when the remote control device is not in use.

Figure 8C:
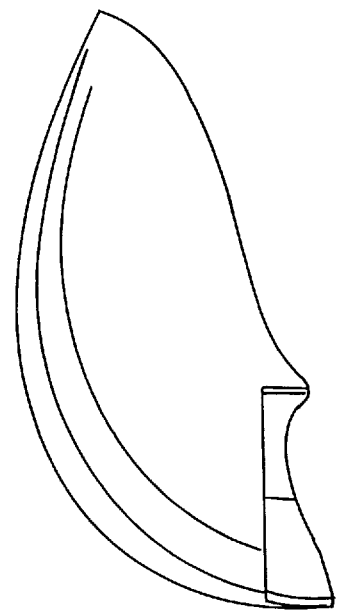
FIGS. 8a–8c depict different views of another embodiment of the present invention.
Figure 8B:
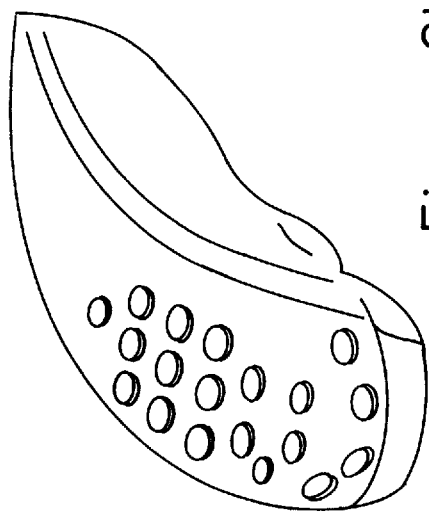
Figure 8A:
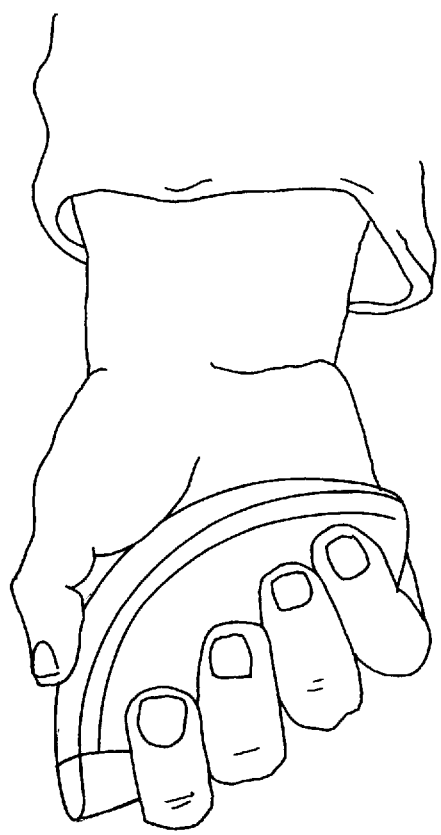

FIGS. 8a–8c depict different views of a still further embodiment of the present invention in which the communication section is angled at nearly 90 degrees with respect to the grip end.

Figure 9:
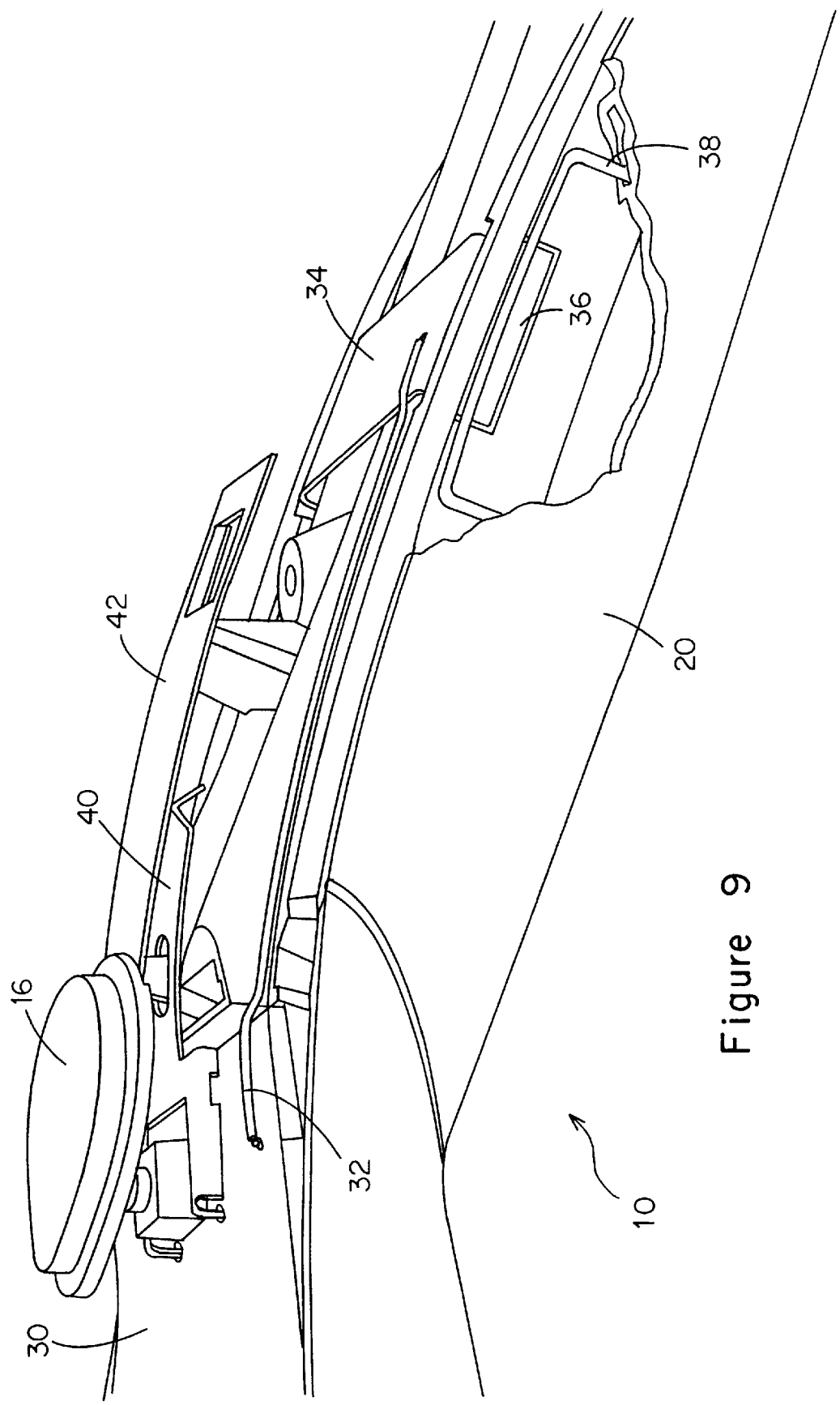
FIG. 9 is a perspective cut-away view of a portion of a remote control device constructed in accordance with an embodiment of the present invention.

FIG. 9 is a perspective partially cut-away view of a remote control device constructed in accordance with an embodiment of the present invention. In this view, the top plate of the remote control device 10 is not depicted so as to illustrate the components of the remote control device 10 that control the mode of the large power consuming circuitry. In the following exemplary embodiment, the large power consuming circuitry is a microprocessor that can be switched between an awake mode and a sleep mode. Such microprocessors are well known. The invention is not limited to use with microprocessors, but also finds utility in remote control devices that contain other types of large power consumption devices.

In the embodiment of FIG. 9, the conductive plate 20 is made of a conductive plastic. The use of conductive plastic is advantageous over metal as it is typically lighter in weight and less thermally conductive, as well as making fabrication easier. A user will therefore not pick up the remote control device 10 and feel either a warm metal or a cold metal plate. The lighter weight also reduces the possibility of hand and arm fatigue. In certain preferred embodiments of the present invention, the conductive plate 20 also forms a door for the battery compartment.

The remote control device 10 houses a printed circuit board (PCB) 30 that carries the circuitry that performs the remotely controlling functionality of the remote control device 10. The PCB 30 may be a conventional remote control PCB, or may be a customized PCB, depending on the applications desired for the remote control device 10. In the exemplary embodiment of the remote control device 10 of the present invention, a microprocessor (not depicted in FIG. 9) is mounted on the PCB 30.

The PCB 30 (as well as the microprocessor on the PCB 30) are connected through a conductive ground wire 32. The other end of the conductive ground wire 32 is connected to a metal ground bracket 34 located within the grip end 14 of the remote control device 10. This contact bracket 34 will be covered by the top plate of the grip end 14 when the remote control device is fully assembled. A downwardly extending portion 36 of the contact bracket 34 contacts a metal spring 38 that is mounted in the conductive plate 20.

The PCB 30 is connected to the battery power supply through two wire form springs. A conductive plastic button 16 is electrically connected to a metal button spring 42. Upon picking up the remote control device 10, the user's hand will contact the conductive plate 20 on the bottom of the grip 14. When operating the remote control device 10 as an air mouse, the user's hand will also contact the conductive plastic button 16. This action completes a circuit path through the user's hand to electrically connect the conductive button 16 and the conductive plate 20. Once the circuit path is completed, the microprocessor is controlled to switch from its sleep state to its awake state. When the microprocessor is in its awake state, which is a relatively high power consumption state, the remote control device 10 can be used as an air mouse, with the usual point and click functions associated with a mouse.

Figure 10:
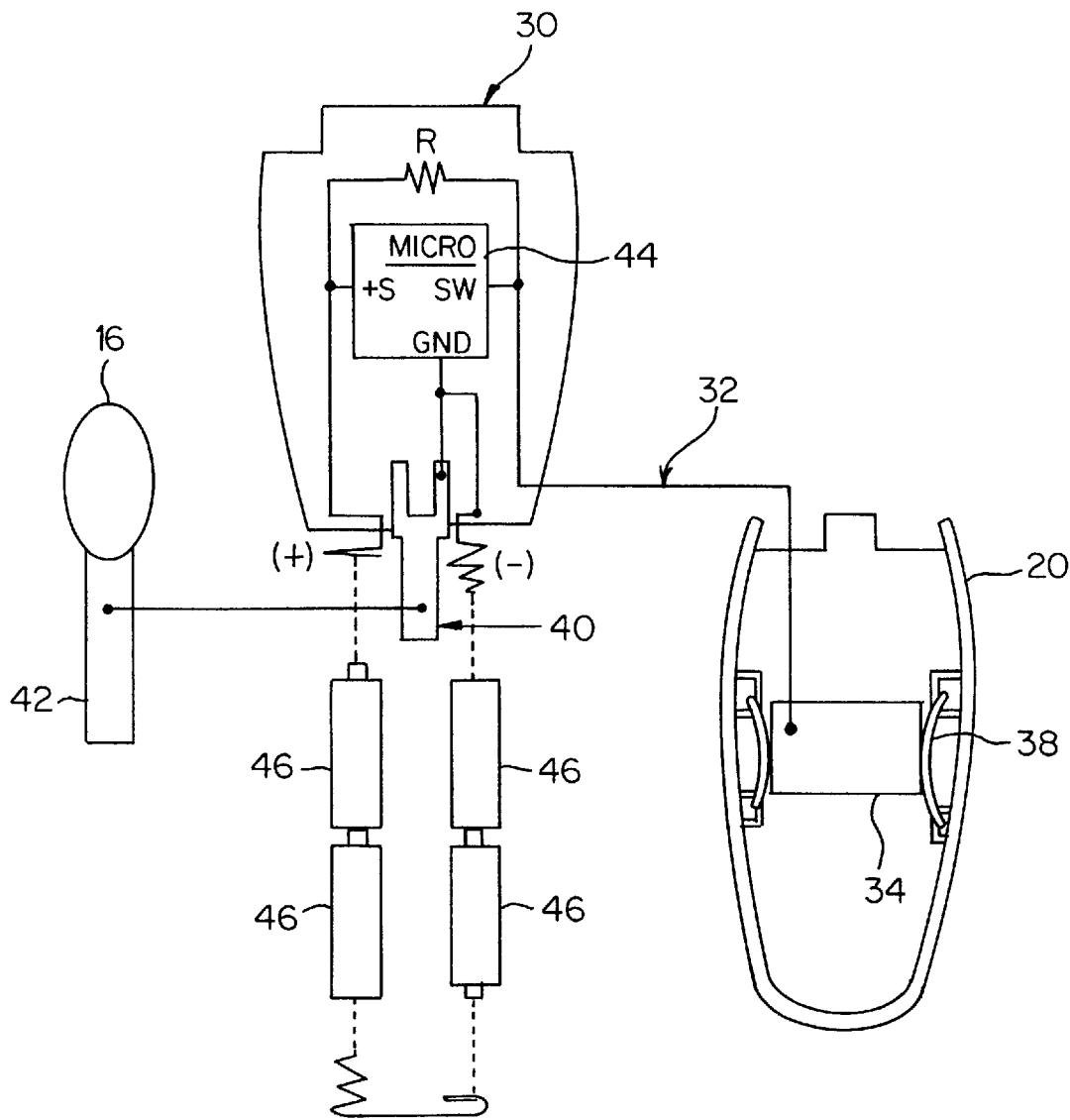
FIG. 10 is a schematic depiction of a portion of the switch circuitry constructed in accordance with an embodiment of the present invention for controlling an awake/sleep mode of a microprocessor.

A schematic depiction of an exemplary embodiment of the arrangement of the components used to control the awake/sleep state of the microprocessor are depicted in FIG. 10, and are generally provided with reference numeral 44, and the batteries have reference numeral 46. The remaining components are already depicted in FIG. 9 and have the same reference numerals as in that Figure.

When the user releases the control button 16 or the remote control device 10, the voltage at the SW input (the awake/sleep control input) drops to a low level. This places the microprocessor into the sleep mode or state, with a characteristically low power consumption. Since the battery power is not being consumed unless the users hand is actually properly holding the remote control device 10 as an air mouse, the batteries will need to be replaced less frequently.

It is to be noted that the switch circuitry that controls the awake/sleep mode of the microprocessor does not impact the operation of the other remote controlling functions, which are operable as in conventional remote control devices.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. A remote control device for controlling a controllable device, comprising:

high power consuming circuitry controllable to enter either a relatively low power sleep mode or a relatively high power awake mode;

an actuation mechanism operable by a user to control the high power consuming circuitry to perform a remote controlling of the controllable device;

a conductive plate that contacts the user hand when the remote control device is held in the user hand; and a switch circuit that causes the high power consuming circuitry to transition between the relatively lower power sleep mode and the relatively high power awake mode, in response to the user holding the remote control device and simultaneously contacting the conductive plate and the actuation mechanism, wherein the relatively high power awake mode enables the remote controlling of the controllable device.

2. The remote control device of claim 1, wherein the actuation mechanism is a control button.

3. The remote control device of claim 1, further including a grip portion for holding of the remote control device in the hand of the user.

4. The remote control device of claim 3, wherein the grip portion includes the conductive plate that contacts the user hand when the remote control device is held in the user hand, the conductive plate forming part of the switch circuit.

5. The remote control device of claim 4, wherein the actuation mechanism forms part of the switch circuit.

6. The remote control device of claim 5, wherein the actuation mechanism is made of conductive material and is a button.

7. The remote control device of claim 6, wherein the conductive material is a plastic.

8. The remote control device of claim 4, wherein the conductive plate is made of plastic.

9. The remote control device of claim 8, wherein the conductive plate is a battery door of the remote control device.

10. The remote control device of claim 6, wherein the high power consuming circuitry includes a microprocessor.

11. An air mouse for pointing and clicking at a controllable device to control the controllable device, the air mouse comprising:

a microprocessor controllable to enter either a relatively low power sleep mode or a relatively high power awake mode;

an actuation mechanism operable by a user to control the microprocessor to perform a remote controlling of the controllable device;

a conductive plate that contacts the user hand when the remote control device is held in the user hand; and a switch circuit that causes the microprocessor to transition between the relatively lower power sleep mode and the relatively high power awake mode, in response to the user holding the air mouse and simultaneously contacting the conductive plate and the actuation mechanism, wherein the relatively high power awake mode enables the remote controlling of the controllable device.

12. The air mouse of claim 11, further including a grip portion for holding of the air mouse in the hand of the user.

13. The air mouse of claim 12, wherein the grip portion includes the conductive plate that contacts the user hand when the air mouse is held in the user hand, the conductive plate forming part of the switch circuit.

14. The air mouse of claim 13, wherein the actuation mechanism forms part of the switch circuit.

15. The air mouse of claim 14, wherein the actuation mechanism is made of conductive material and is a button.

16. The air mouse of claim 15, wherein the conductive material is a plastic.

17. The air mouse of claim 13, wherein the conductive plate is made of plastic.

18. The air mouse of claim 17, wherein the conductive plate is a battery door of the air mouse.

* * * * *